United States Patent Office 2,901,684
Patented Aug. 25, 1959

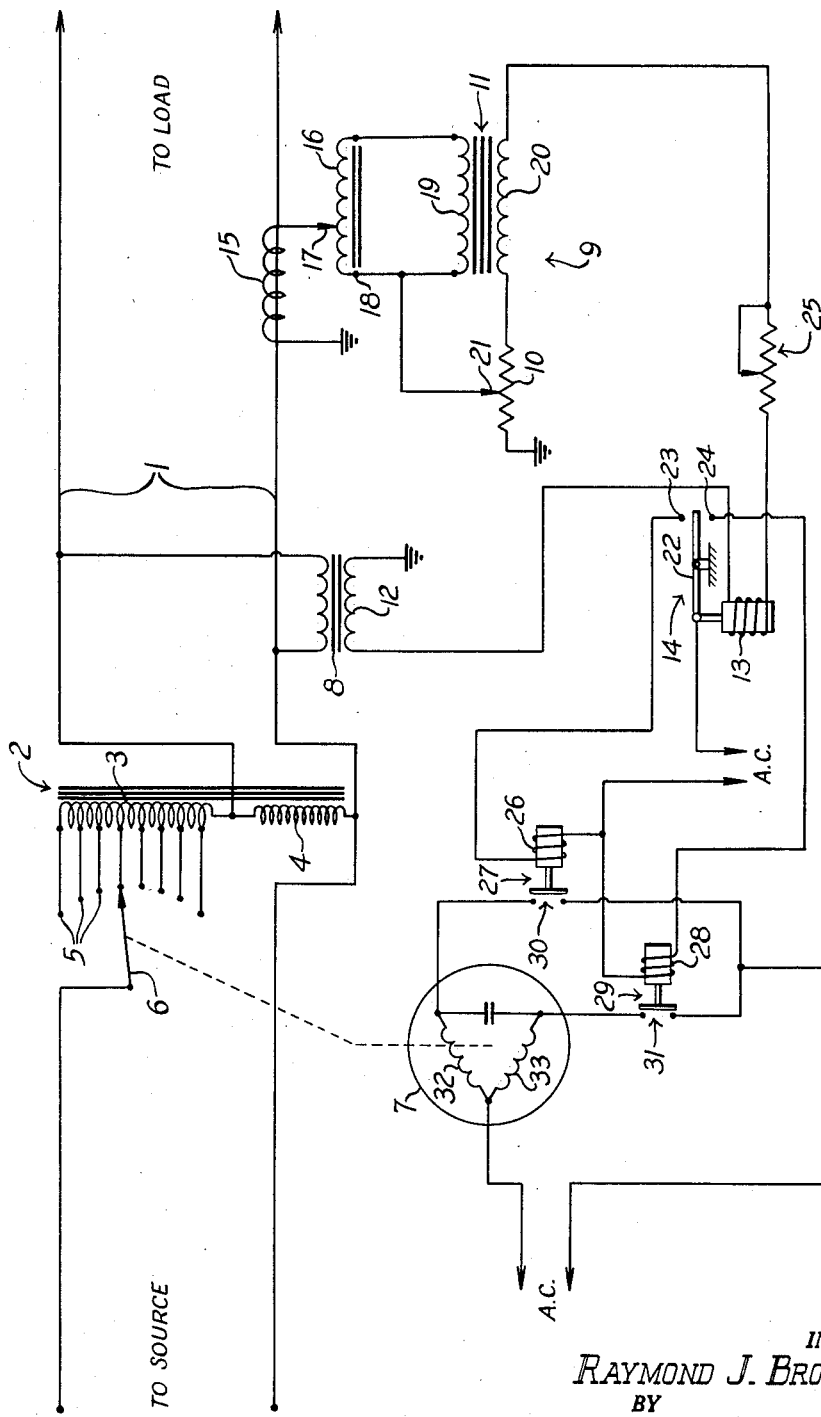

2,901,684

LINE DROP COMPENSATING CIRCUIT

Raymond J. Bronikowski, Milwaukee, Wis., assignor to McGraw-Edison Company, Milwaukee, Wis., a corporation of Delaware Application August 30, 1957, Serial No. 681,219

8 Claims. (Cl. 323—66)

This invention relates to a line drop compensating circuit for a voltage regulating system and particularly to a continuously adjustable reactance component for the compensating circuit.

A voltage regulating system is connected at a control center in a line circuit to automatically vary the voltage at the control center to maintain a constant voltage at a load center on the line which is spaced from the control center. A voltage sensitive device is energized by a potential circuit to vary the line voltage at the control center. The potential circuit includes a means to establish a potential proportional to the line voltage at the control center and also a line drop compensating circuit to automatically insert in the potential circuit a voltage drop proportional to the actual voltage drop in the line caused by the line impedance between the control center and the load center. Consequently, the voltage applied to the voltage sensitive device is proportional to the line voltage at the load center.

Conventionally, line drop compensating circuits may employ a current which is proportional to and in phase with the line current. This current energizes a resistance device and a reactance device, each of which are made proportional to the actual resistance and reactance in the line to establish voltages which are proportional to the actual voltage drops due to the line impedance. These voltages are vectorially added to the control center proportional voltage to establish a voltage truly proportional to the voltage at the load center.

It is important that a resistance drop and a reactance drop which are exactly 90° out of phase with each other be inserted by the line drop compensating circuit. If this vectorial relationship varies due to the components in the compensating circuit, phase angle error is introduced and the control voltage applied to the voltage sensitive device is not truly proportional to the load center voltage. This is particularly important in voltage regulating systems which are to meet the strictest standards of accuracy as established by various recognized organizations, such as the National Electrical Manufacturers Association and/or the American Standards Association. Conventional voltage regulating systems have phase angle error introduced therein and employ special circuits to correct for this phase angle error.

Separate voltage regulating apparatus is installed at various control centers in the power distribution system and each requires field adjustment in accordance with the actual resistance and reactance in the power lines between the particular control center and the corresponding load center. This is normally done by simple setting of factory calibrated control dials which are connected to circuit elements and automatically set the circuit elements to a position corresponding to the actual line resistance and line reactance.

In known regulating systems, the factory calibration is generally quite complex because of the special circuits to correct for phase angle error.

In accordance with the present invention, a resistance device and a reactance device are connected in a potential circuit including a voltage proportional to the line voltage at the point of regulation. A current proportional to the line current energizes the resistance device to establish a resistance voltage drop in the potential circuit proportional to the actual resistance drop in the line circuit. A current proportional to the line circuit current is also employed to energize a reactor in the potential circuit to establish a reactance drop in the potential circuit proportional to the actual reactance drop in the line circuit. A current control winding having a large inductance and a small resistance is connected between the current source and the reactor with one of the connections being a continuously adjustable sliding contact on the current control winding. The sliding contact is adjusted to vary the proportion of the current energizing the reactor and therefore establishing a reactance voltage drop in the potential circuit in proportion to the actual reactance voltage drop in the line circuit. This construction provides a loss-less linear potentiometer to vary the voltage established in the reactor. As both the reactor and the current control winding are similar type impedance devices, phase angle error is not introduced into the compensating circuit.

The accompanying drawing illustrates the best mode presently contemplated by the inventor for carrying out the invention.

The drawing furnished herewith is a schematic circuit of a voltage regulating system having certain components shown more or less diagrammatically for purposes of clarity.

Referring to the drawing, a pair of power lines 1 is shown which connect a load center, not shown, to a suitable source of alternating current, not shown. A voltage regulating autotransformer 2 is interposed between the load center and the current source as a control center to vary the line voltage.

The autotransformer 2 includes a tapped series winding 3 connected in series with a shunt winding 4 to the current source. The series winding 3 is provided with a plurality of tap connections 5. A motor-driven tap 6 is connected to one side of the power lines 1 and is selectively engaged with the tap connections 5 to vary the voltage output of the shunt winding 4 which is connected to the load center. The tap 6 is automatically positioned by a conventional reversible motor 7 to maintain a substantially constant voltage at the load center, as hereinafter described.

A potential transformer 8 is connected across the shunt winding 4 at the control center to establish a control voltage proportional to the voltage at the control center. A line drop compensating circuit 9 is provided to establish a voltage proportional to the line drop voltage existing between the regulating autotransformer 2 and the load center, not shown. A resistor 10 and a reactor 11, each of which constitute a part of the line drop compensating circuit 9, are connected in series with each other and with the secondary winding 12 of the potential transformer 8 to establish potential circuit energizing a winding 13 of a contact-making voltmeter 14. The resistor 10 and reactor 11 are energized by an auxiliary current which is proportional to the line current to establish a compensating potential. The compensating potential is added to the potential established in the secondary winding 12 and provides a voltage proportional to a load center voltage.

To obtain an auxiliary current proportional to the line current, a current transformer 15 is coupled to one of the power lines 1. The output of the transformer 15 is connected to ground and to the input of an autotransformer 16 by a continuously adjustable tap 17. The autotransformer 16 includes a common input-output terminal 18 which is connected to ground through a selected part of the resistor 10, as hereinafter described, and which is also connected to one side of a primary reactor winding 19 of reactor 11. The opposite end terminal of the autotransformer 16 is connected to the opposite side of the primary winding 19. The primary winding 19 is magnetically coupled to a coupled reactor winding 20 such that a current in winding 19 establishes a corresponding voltage in the winding 20 which is in series with resistor 10.

When the tap 17 is connected to an intermediate point on the autotransformer 16, the current established by the current transformer 15 divides and flows to either side of tap 17. Part of the current flows through the autotransformer 16 from tap 17 to and through the primary winding 19 and then to ground through the resistance 10.

The current flowing through the primary winding 19 inductively establishes a reactance voltage drop in the coupled winding 20.

The autotransformer 16 has an extremely high reactance, a usual value of a commercially available autotransformer being of the order of 20,000 ohms. The primary winding 19 is constructed to provide a relatively minute reactance, of the order of 120 ohms. Consequently, the reactance of the branch circuit including a portion of the autotransformer 16 in series with primary winding 19, for all practical purposes, is essentially determined solely by the reactance of the autotransformer 16 which is connected therein. The current flowing in winding 19 is then essentially independent of the reactance of winding 19. Therefore, the autotransformer 16 provides a linear reactive potentiometer for dividing the line proportional current and thereby permits varying the reactance drop inserted in the line drop compensating circuit.

A linear potentiometer allows simple factory assembly of the regulating system and avoids the problem of calibration existing in non-linear devices.

The tap 17 is adjusted, generally by the customer, such that the current division from the current transformer 15 is directly proportional to the ratio of the actual reactance of the line circuit existing between the control center and the load center and the reactance of the primary winding 19. The voltage appearing across the primary winding 19 is then proportional to the actual voltage drop in the line circuit due to the reactance between the control center and the load center.

A suitable calibrated control dial, not shown, is provided to make the adjustment by the customer simple and rapid.

The voltage appearing across winding 19 also appears across the coupled winding 20 and decreases the potential established across the contact-making voltmeter 14 by the secondary winding 12 of the potential transformer 8.

As both the autotransformer 16 and the primary reactor winding 19 are essentially inductive devices, substantially no phase angle error is introduced into the circuit. Further, as the windings 16 and 19 have no appreciable resistance, an extremely low level of heat is generated and the $I^2R$ loss is at a minimum.

As previously described, the total current established by the current transformer 15 flows through a portion of the resistor 10 from the autotransformer 16 and primary winding 19. The resistance is connected to the common input-output side of the autotransformer 16 by a movable tap 21 to permit adjustment of the portion of the resistance energized by the current from transformer 15. The tap 21 is adjusted to insert a resistance between the terminal 18 and ground which is proportional to the actual resistance existing in the line circuit between the control center and the load center.

The total current from the current transformer 15 energizes the connected portion of the resistor 10 and vectorially subtracts from the potential inserted into the potential circuit by the secondary winding 12.

Consequently, the net control voltage which is applied to the contact-making voltmeter winding 13 is equal to the vectorial sum of the voltage inserted by the secondary winding 12 of the potential transformer 8, the coupled reactor winding 11 and the portion of the resistor 10 between ground and tap 20. Further this net voltage is proportional to the line voltage at the load center and it duplicates, on a ratio basis, actual voltage condition on the circuit between the control center and the load center.

The winding 13 is magnetically coupled to a contact arm 22 and positions the arm with respect to an upper limit contact 23 and a lower limit contact 24 both of which are adjustably mounted one to each side of the arm 22. An adjustable voltage centering resistor 25 is connected in series with the winding 13 in the control potential circuit and by suitable adjustment of resistor 25, the arm 22 is positioned in a neutral position midway between the contacts 23 and 24 for a predetermined net control voltage.

The arm 22 is connected to one side of a suitable source of current; such as conventional 110 volt, 60 cycle current lines. The contacts 23 and 24 are each connected to the other side of the current source in series with a corresponding relay winding 26 of a control relay 27 and relay winding of a control relay 29.

The control relays 27 and 29 include a pair of normally open contacts 30 and 31, respectively, which are connected to selectively energize the reversible motor 7. The contacts 30 are connected in series with a winding 32 to a suitable source of alternating current to drive the motor 7 in a forward direction when the contacts 30 close as a result of an increased control voltage which effects engagement of arm 22 and contact 23. The contacts 31 of relay 29 are similarly connected in series with a second winding 33 to drive the motor in a reverse direction when contacts 31 close as a result of a decreased control voltage which effects engagement of arm 22 and the contact 24.

The motor 7 is coupled to the mechanically movable tap 6 to adjust the input to the series winding 3 of the voltage regulation transformer 2 to maintain the voltage output at the load center at a predetermined voltage as follows.

Relay contacts 30 are closed incident to a predetermined increased control voltage and the motor 7 is coupled to tap 6 in such a manner as to move the latter to a tap connection 5 which reduces the number of turns in the series winding 3. The voltage supplied to the load center is thereby correspondingly reduced. The net control voltage then applied to the winding 13 of contact-making voltmeter 14 is proportionately reduced. The motor 7 continues to operate to change the voltage supplied to the load center until the net control voltage applied to the contact-making voltmeter 14 is sufficiently reduced to effect disengagement of contact arm 22 and contact 23, thereby stopping the motor.

Similarly, contacts 31 are closed incident to a predetermined decreased voltage and energize the associated motor winding 33 to move tap 6 to a tap connection 5 to increase the voltage supplied to the load center. The motor 7 operates until the contact-making voltmeter 14 disengages arm 22 from contact 24, thereby stopping the motor.

Hunting of the voltage regulating system is prevented in any suitable manner, such as by inertia loading the relay contacts 30 and 31 to insert a time delay in the closing thereof.

The present invention provides a simple and accurate reactance compensating system for voltage regulator control circuits.

Various modes of carrying out the invention are contemplated as being within the scope of the following claims particularly pointing out and distinctly claiming the subject matter which is regarded as the invention.

I claim:

1. A continuously adjustable reactance circuit for a single phase line drop compensating circuit which comprises, a reactor winding adapted to be connected in said compensating circuit, a current source operatively associated with the single phase line to energize said reactor winding with a current proportional to and in phase with the line current, and a current control winding connected in parallel with said reactor winding to said current source and having a sliding contact means engaging the winding to simultaneously adjustably connect a first portion of said current control winding in series with said reactor winding and across said current source and a second portion of said current control winding across said current source substantially independently of said reactor winding to adjust the reactance inserted in said compensating circuit by said reactor winding, said current control winding having a high reactance and a low resistance.

2. A continuously adjustable reactance circuit for a line drop compensating circuit which cimprises, a reactor winding adapted to be connected in said compensating circuit, a current source operatively connected to the line circuit to energize said reactor winding with a current proportional to and in phase with the line current, a high reactance autotransformer means having input terminals connected across the current source and output terminals connected across the reactor winding, and at least one of said autotransformer terminals comprising a sliding contact on the autotransformer to permit continuous adjustment of the portion of the autotransformer winding connected in series with the reactor winding across said current source.

3. A reactance compensating circuit to establish a voltage proportional to the reactance drop in a set of power lines between the control center and a load center, said voltage being vectorially added to a control center proportional voltage and a line resistance proportional voltage to establish a load center proportional voltage, which comprises a reactor winding adapted to be connected in series with said control center proportional voltage to vectorially add to said voltage, a current source operatively associated with the power lines to establish a current proportional to said line current, and a control winding connected in parallel circuit relation to said reactor winding and adjustably connected across said current source to effect a linear adjustable division of the current from said current source through a portion of the control winding in series relation with said reactor winding, said control winding having a sufficiently high reactance relative to said reactor winding that the current through the reactor winding is essentially independent of the reactance of said reactor winding.

4. A reactance compensating circuit to establish a voltage proportional to the reactance drop in a set of power lines between a control center and a load center, said voltage being vectorially added to a control center proportional voltage to establish a load center proportional voltage, which comprises a reactor winding adapted to be serially connected with said source proportional voltage, a second reactor winding magnetically coupled with said first reactor winding to inductively establish a voltage in the first reactor winding corresponding to the current in said second reactor winding, a control winding connected in parallel with said second reactor winding, and a current source operatively associated with the power lines to establish a current proportional to the power line current and adjustably connected across said control winding to vary the current through said control winding and said second reactor winding, the reactance of said control winding being sufficiently greater than the reactance of said second reactor winding that the current through said second reactor winding is essentially determined by the reactance of the control winding in series connection with the second reactor winding.

5. In a voltage regulating system for an alternating current circuit and having an electroresponsive means connected to respond to the voltage of a predetermined position of said circuit, a line drop compensating means having a resistance means and a reactor means having a winding and operatively connected with said electroresponsive device, means for energizing said resistance with a current proportional to the line current, an isolating winding in said reactor means for inductively establishing a voltage in said first named winding which is proportional to the reactance drop in said line, said isolating winding having a low resistance and reactance, and a high reactance autotransformer having a continuously adjustable connecting terminal interposed between said isolating winding and said current source to establish a line proportional current in said isolating winding substantially independent of the reactance of the isolating winding.

6. In combination in a line drop compensator for voltage regulation of a main circuit, a potential circuit serially including a resistor and a reactor and an electroresponsive means, said reactor having a low impedance, said potential circuit being energized in accordance with the potential of said main circuit, a current source energized in accordance with the current in said main circuit, means to pass the current from said current source through a portion of said resistance proportional in magnitude to the resistance in said main circuit to be compensated for, and a high reactance autotransformer means having input terminals connected to said current source and output terminals connected to said reactor, and at least one of said terminals constituting a sliding contact on the winding of said autotransformer means to permit continuous adjustment of the autotransformer in series connection with the reactor across said current source.

7. A voltage regulating system for an electrical circuit having distribution lines and including electroresponsive means to adjust the line voltage at a control center to maintain a relatively constant voltage at a load center, which comprises voltage sensitive means operatively associated with the lines at the control center to establish a signal voltage proportional to the line voltage, current sensitive means operatively associated with the lines to establish a current in phase with the line current, an adjustable resistance potentiometer having a resistor connected in series circuit with said signal voltage and having a tap adjustably connecting the resistor across said current sensitive means in proportion to the total resistance between said control center and said load center, a reactor winding connected in a series circuit with said resistor and said voltage sensitive means to establish a control voltage to control said electroresponsive means, a primary winding inductively connected to said reactor winding, and an adjustable autotransformer having a first set of terminals across said primary winding and a second set of terminals connected across said current sensitive means, and at least one of said terminals being continuously adjustable to permit adjusting the portion of the autotransformer winding connected in series circuit relation with said primary winding, the relative reactance of the autotransformer and the primary winding being such that the current through the primary winding is determined essentially in whole by the autotransformer in series therewith.

8. In a voltage regulator for a main circuit, a potential transformer energized in accordance with the potential of the main circuit, a resistor and a reactor winding serially connected with each other and with the output of said potential transformer, a current source energized in accordance with the current in the main circuit, a low reactance winding magnetically coupled to said reactor winding, a step-up autotransformer having output terminals connected across said low reactance winding, a continuously adjustable sliding contact input terminal in said autotransformer connected to one side of said current source to adjust the current directed to said low reactance winding, and an adjustable tap connection on said resistor connected to the other input terminal of said autotransformer to complete the return circuit to said current source through a selected portion of said resistor, said autotransformer having a reactance sufficiently large compared to the reactance of said low reactance winding that the current flow in the low reactance winding is essentially solely determined by the autotransformer.

References Cited in the file of this patent

UNITED STATES PATENTS 2,234,746   West _____ Mar. 11, 1941